United States Patent

Wu et al.

[11] Patent Number: 5,570,418
[45] Date of Patent: Oct. 29, 1996

[54] DEVICE FOR DETECTING OPERATION STATE OF TELEPHONE HOOK SWITCH

[75] Inventors: Jui-Kuang Wu; Mao-Sung Chen; Meng-Tsang Wu, all of Hsin-Chu, Taiwan

[73] Assignee: Winbond Electronics Corporation, Hsin-Chu, Taiwan

[21] Appl. No.: 457,908

[22] Filed: Jun. 1, 1995

Related U.S. Application Data

[63] Continuation of Ser. No. 245,800, May 19, 1994, abandoned.

[51] Int. Cl.⁶ .......................... H04M 3/22; H04M 1/00; H04M 3/00; H04M 1/66
[52] U.S. Cl. .................. 379/164; 379/31; 379/32; 379/124; 379/156; 379/157; 379/161; 379/188; 379/189; 379/199; 379/200
[58] Field of Search ................... 379/31, 32, 124, 379/156, 157, 161, 164, 188, 189, 199, 200

[56] References Cited

U.S. PATENT DOCUMENTS

| | | | |
|---|---|---|---|
| 4,003,800 | 12/1976 | Jackson | 379/200 |
| 4,008,379 | 2/1977 | Watkins | 379/200 |
| 4,012,602 | 3/1977 | Jackson | 379/200 |
| 4,063,036 | 12/1977 | Hunsicker | 379/200 |
| 4,232,200 | 11/1980 | Hestad | 379/188 |
| 4,683,583 | 7/1987 | Kossor | 379/200 |
| 4,833,707 | 5/1989 | Serret | 379/188 |
| 4,860,347 | 8/1989 | Costello | 379/199 |
| 4,924,499 | 5/1990 | Serby | 379/200 |
| 4,965,459 | 10/1990 | Murray | 379/189 |

*Primary Examiner*—Wellington Chin
*Assistant Examiner*—Vijay Shankar
*Attorney, Agent, or Firm*—Barnes, Kisselle, Raisch, Choate, Whittemore & Hulbert, P.C.

[57] ABSTRACT

A device for detecting an operation state of a telephone hook switch in a telephone includes a timer, a controlling circuit, a counter and a table electrically interconnected. According to the present invention, the abnormal signals generated by the hook switch cannot be accepted by an exchange or even if the signals are accepted by the exchanger, the mute function of the telephone will be utilized to make the users unable to listen to each other.

14 Claims, 7 Drawing Sheets

DEVICE FOR DETECTING OPERATION STATE OF TELEPHONE HOOK SWITCH

This is a continuation of application Ser. No. 08/245,800 filed on 05/19/94, now abandoned.

FIELD OF THE INVENTION

The present invention relates to a detecting device, and more precisely to a device for detecting an operation state of a telephone hook switch which generates a pulse responsive to the operation state.

BACKGROUND OF THE INVENTION

For an exchange which can receive pulse-mode signals, if the dial rate of the signal on the line is consistent with the make-break-ratio of the signal, the exchange will accept this pulse-mode signal. Referring to FIG. 1, HKSW is a pulse state of a telephone hook switch and DP represents a pulse-mode signal which is sent out from the telephone to the exchange. The symbol Tm and Tb in FIG. 1 represent the make and the break time respectively. The symbol Tf is the dial time so that 1/Tf represents the dial rate. The output numbers represented by pulse groups of DP in FIG. 1 are 3 and 2. HKSW is "low" when the telephone is in an off-hook operational mode, i.e. when the receiver of the telephone is lifted up and "high" when the telephone is in an on-hook operational mode, i.e. when the receiver is put back. In general, the operation rate of HKSW obtained by manipulating the hook switch is different from that of DP generated by dialing a dial or a keypad. However, as shown in FIG. 2, the pulse state of HKSW can be made consistent with the pulse state of DP if the user tries to reach the operation state of the hook switch by way of lifting up and putting back the receiver or intermittently pressing the hook switch in a certain rate. That is, the signal generated by the hook switch can substitute for the signal generated by the dial or the keypad and be accepted by the exchange. Then, the telephone lock-control system or code-identifying system will possibly be void or null. For example, in a telephone lock-control system which disallows the signals representing telephone numbers beginning with 0 to be accepted by an exchange, the pulse groups representing the numbers after 0 will not be sent out by the telephone if the telephone detects a pulse group representing the number 0 generated by a dial or a keypad in the beginning. However, if the pulse group representing the number 0 is not generated by the dial or the keypad but by the hook switch, the pulse groups representing the numbers after 0 will be allowed to be sent out and the signal representing the telephone number will be accepted by the exchange. By this way, the telephone lock-control system is rendered ineffective.

SUMMARY OF THE INVENTION

An object of the present invention is to provide a device for detecting an operation state of a telephone hook switch to make an exchange only receive the signals generated by a dial or a keypad.

A further object of the present invention is to provide a device for detecting an operation state of a telephone hook switch to prevent a telephone lock-control system and a code-identifying system from being void or ineffective.

Since a telephone lock-control system and a code-identifying system can be nullified by manipulating the hook switch of a telephone to generate a pulse-mode signal acceptable by an exchange, according to the present invention, a nullifying attempt can be prevented by determining whether the telephone is normally used and disallowing the abnormally used telephone to be successfully dialed.

In accordance with the present invention, a device for detecting an operation state of a telephone hook switch generating a pulse responsive to the operation state comprises a timer outputting a signal after counting at least one kind of time interval, and a controlling circuit electrically connected to the timer, checking the pulse and the signal in order to determine whether a telephone having a mute signal and the hook switch is normally used and allowing the telephone to be regularly dialed if the telephone is used normally while disallowing the telephone to be successfully dialed if the telephone is used abnormally.

In accordance with another aspect of the present invention, the at least one kind of time interval counted by the timer includes a first, a second, a third, and a fourth time intervals Td1, Td2, Td3 and Td4.

In accordance with another aspect of the present invention, the controlling circuit generates a clearing signal to a counter which is also included in the present device and electrically connected to the controlling circuit to have the counter zeroed if the operation state of the hook switch remains unchanged during a certain time interval counted by the timer but an enabling signal to the counter to have the counter carried whenever the controlling circuit detects that the timer counts up the time interval Td3.

In accordance with another aspect of the present invention, the certain time interval is one of the time intervals Td1, Td2, and Td4.

In accordance with another aspect of the present invention, the counter informs the controlling circuit to allow the telephone to be regularly dialed when the counter is zeroed, and informs the controlling circuit to disallow the telephone to be successfully dialed when the counter is carried accumulatedly to a reference value prestored in the counter.

In accordance with another aspect of the present invention, the present device further comprises a table electrically connected between the timer and the controlling circuit for storing therein the time intervals and the reference value. In accordance with the present invention, that the telephone is used abnormally is to manipulate the hook switch by lifting up and putting back the receiver of the telephone or intermittently pressing the hook switch in a certain rate resembling the make-break-ratio of the signal generated by the dial or the keypad of the telephone.

In accordance with another aspect of the present invention, that the telephone is disallowed to be successfully dialed is to make the telephone and the exchange electrically connected thereto under a call disconnection state or to utilize the mute function of the telephone to make the telephone under a sound-forbidden state and the users unable to listen to each other.

In accordance with another aspect of the present invention, the timer starts counting the time intervals Td3 and Td2 whenever the hook switch is changed from an on-hook operation state into an off-hook operation state.

In accordance with another aspect of the present invention, the controlling circuit has the counter carried when the controlling circuit detects that the time interval Td3 has been counted up by the timer, and the timer keeps on counting the time interval Td2.

In accordance with another aspect of the present invention, the controlling circuit sends out the clearing signal to have the counter zeroed when the controlling circuit detects that the timer has counted up the time interval Td2 and the hook switch remains in an off-hook operation state, but enables the timer to start counting the time interval Td1 if the hook switch is changed from an off-hook operation state into an on-hook operation state during the time interval Td2.

In accordance with another aspect of the present invention, the controlling circuit sends out the clearing signal to have the counter zeroed when the controlling circuit detects that the timer has counted up the time interval Td1 and the hook switch remains in an on-hook operation state, but the controlling circuit won't have the counter zeroed if the hook switch is changed from an on-hook operation state into an off-hook operation state during the time interval Td1.

In accordance with another aspect of the present invention, the controlling circuit enables the timer to start counting the time interval Td4 when the telephone is disallowed to be successfully dialed and the hook switch is under an on-hook operation state again, and has the counter zeroed upon detecting that the time interval Td4 has been counted up and the hook switch remains in an on-hook operation state.

In accordace with another aspect of the present invention, the present device is incorporated in the dial or the keypad of the telephone or electrically connected to the dial or the keypad of the telephone.

The present invention may be best understood through the following description with reference to the accompanying drawings, in which:

DETAILED DESCRIPTION OF THE PREFERRED EMBODIMENT

Figure 1:
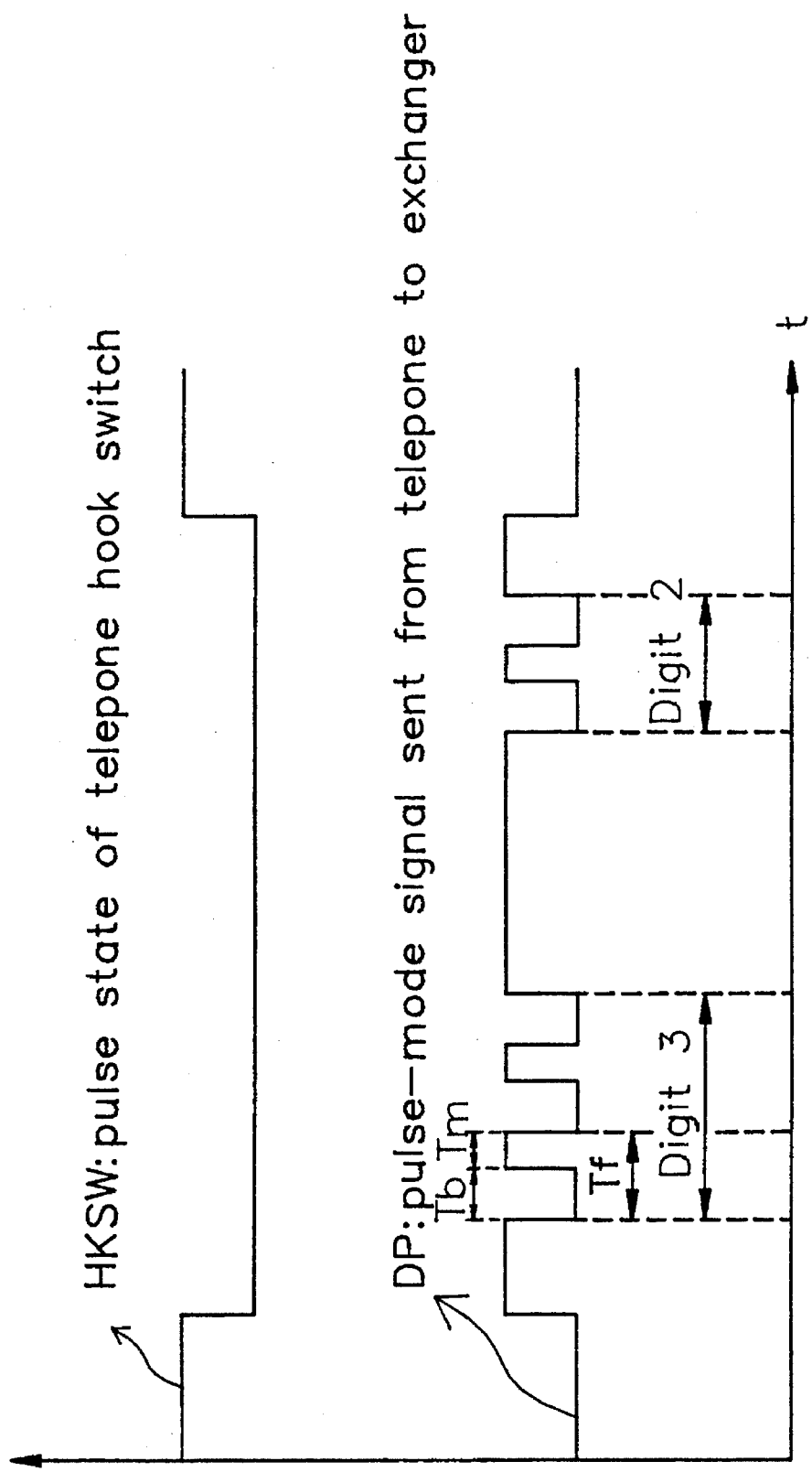
FIG. 1 is a schematic diagram showing the pulse-mode signals generated by the hook switch and the dial or keypad of a telephone which is normally used.

As mentioned in the description with reference to FIG. 1, HKSW is "low" when the telephone is in an off-hook operational mode or when the receiver of the telephone is lifted up, while HKSW is "high" when the telephone is in an on-hook operational mode or when the receiver is put back.

Figure 3:
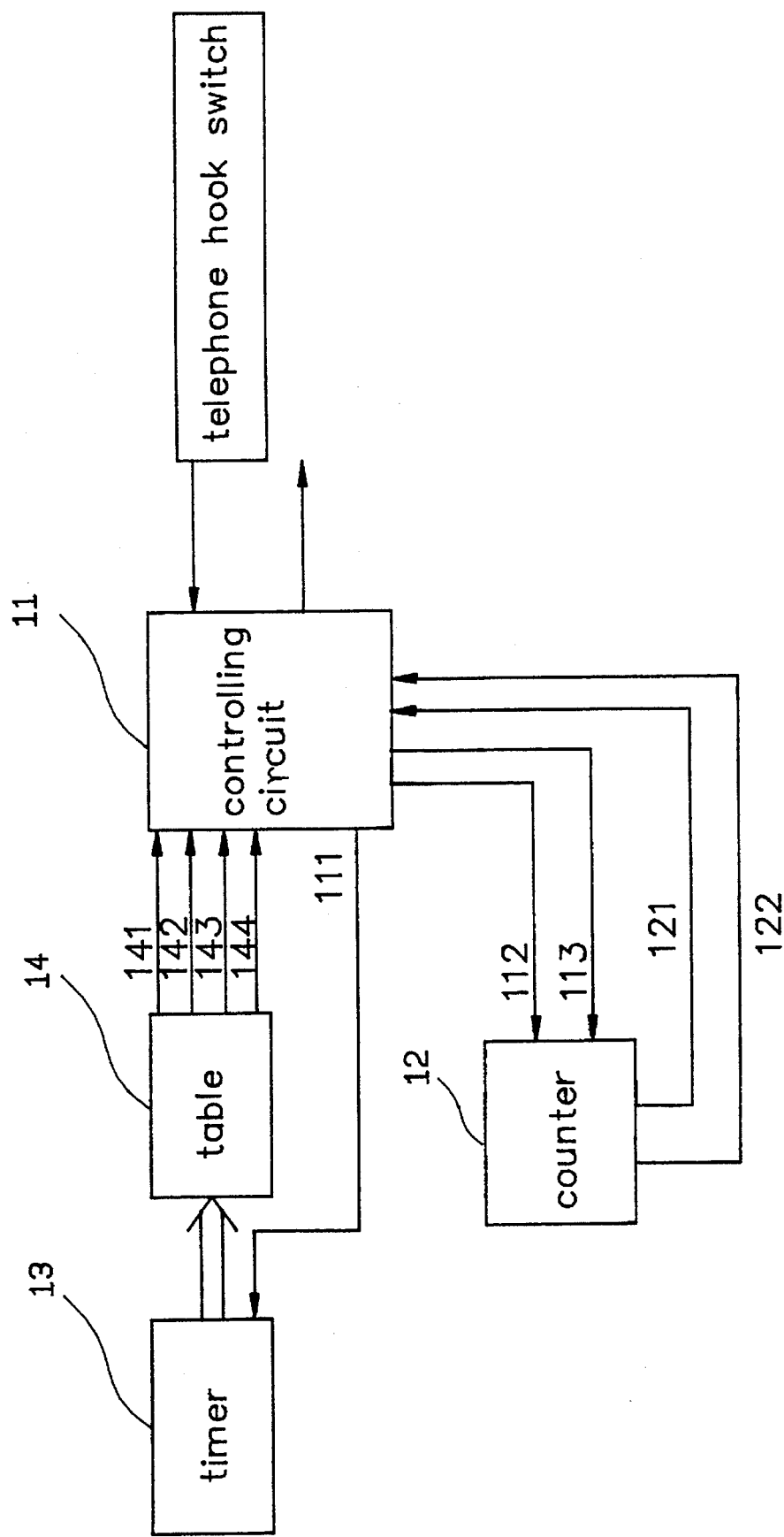
FIG. 3 is a schematic block diagram showing a preferred embodiment of a device for detecting an operation state of a telephone hook switch according to the present invention.

Referring now to FIG. 3, a preferred embodiment of a device for detecting an operation state of a telephone hook switch according to the present invention includes a controlling circuit 11, a counter 12, a timer 13 and a table 14. Hereinafter, four examples of working states for the detecting device according to the present invention are described. It is to be noted that the following description with respect to preferred embodiments of this invention are presented herein for purpose of illustration and description only; it is not intended to be exhaustive or to be limited to the precise form disclosed.

Figure 4:
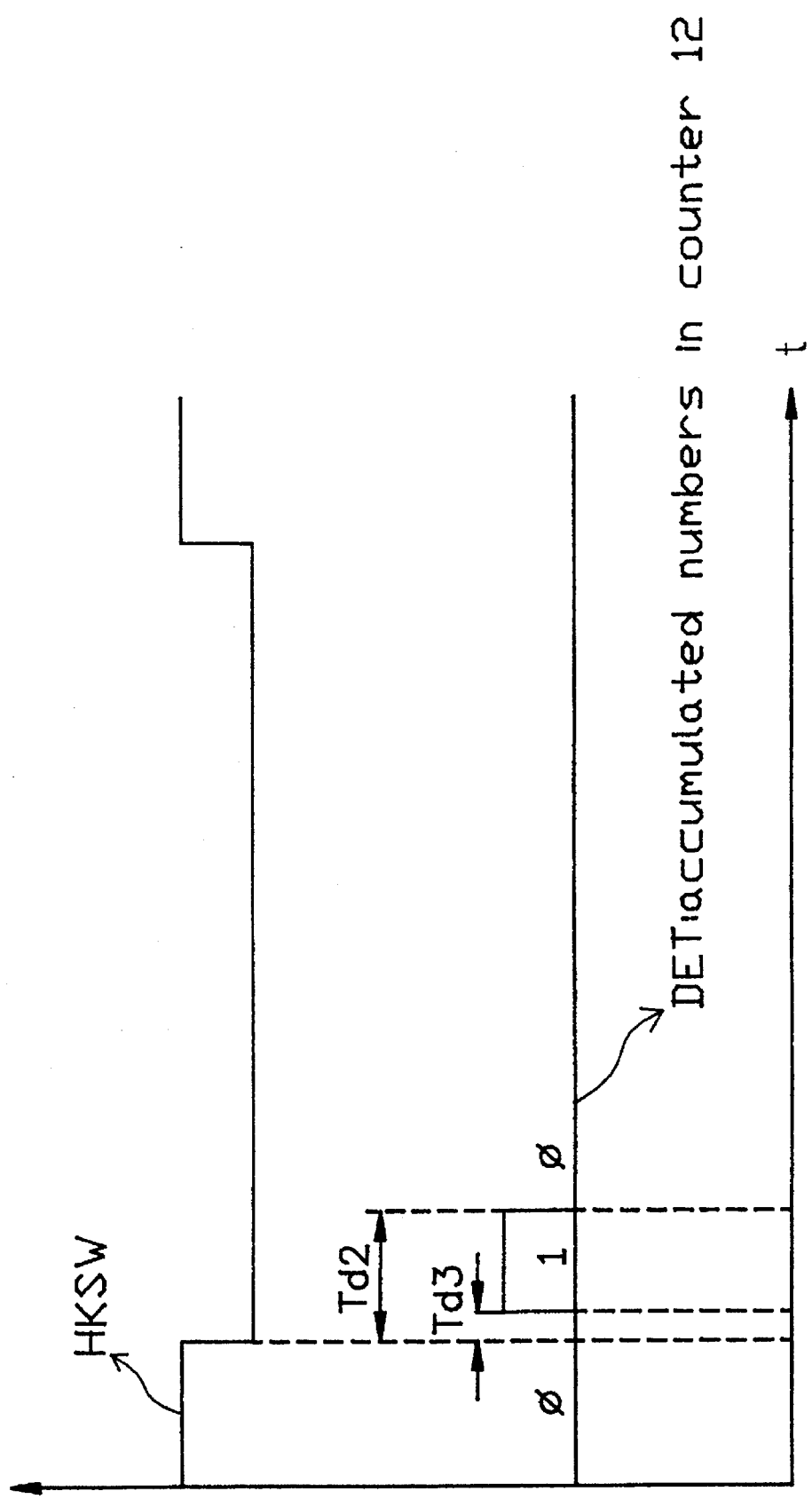
FIG. 4 is a schematic diagram showing first relevant pulse-mode signals generated by a device for detecting an operation state of a telephone hook switch and by the hook switch according to the present invention.
Figure 5:
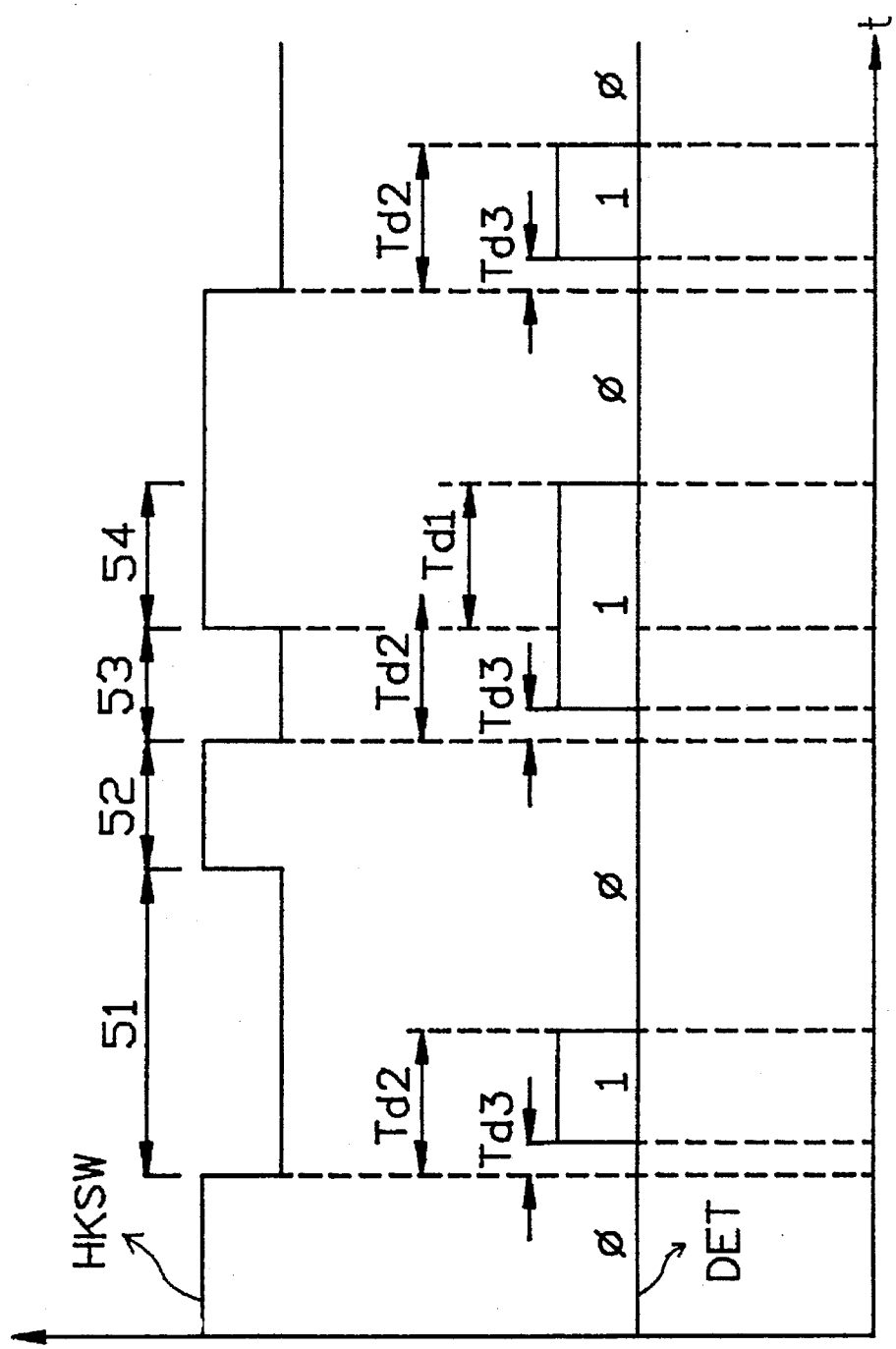
FIG. 5 is a schematic diagram showing second relevant pulse-mode signals generated by a device for detecting an operation state of a telephone hook switch and by the hook switch according to the present invention.
Figure 6:
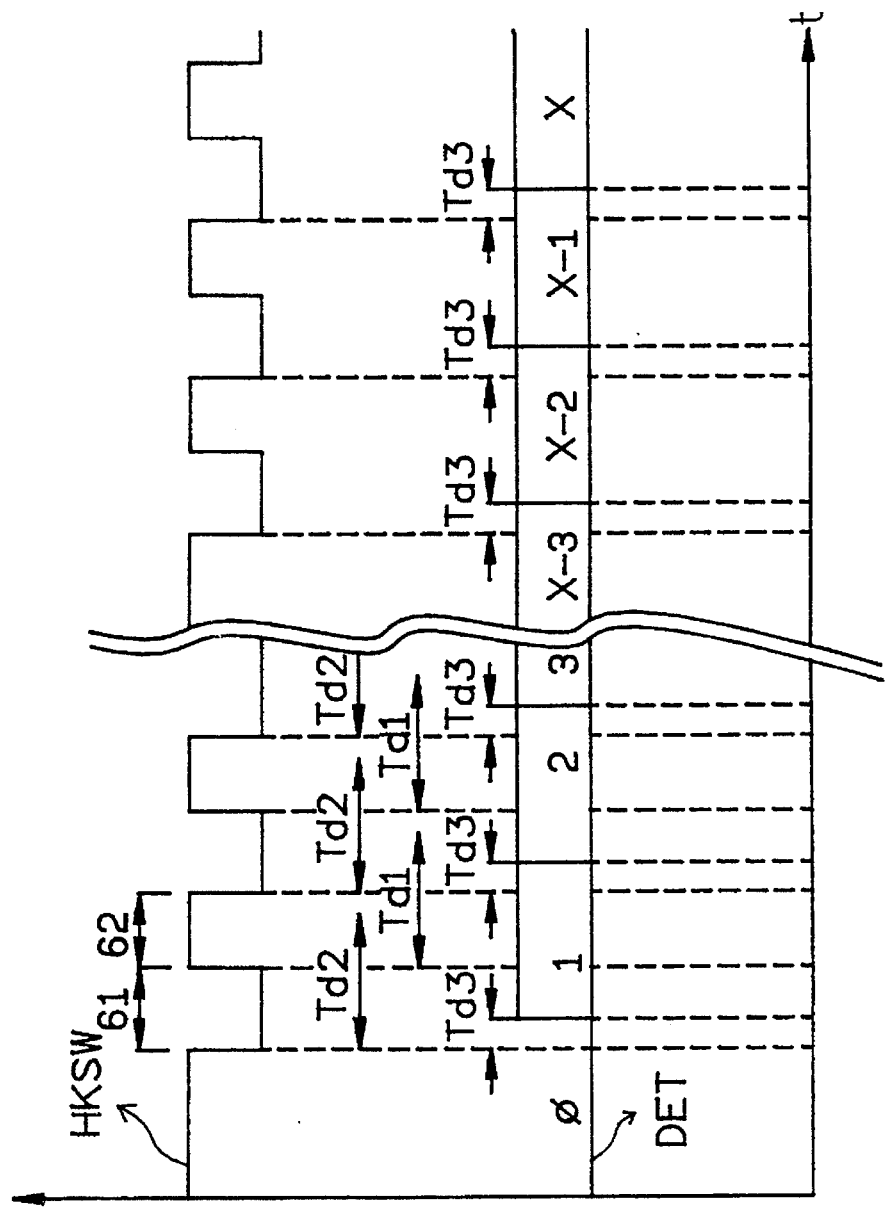
FIG. 6 is a schematic diagram showing third relevant pulse-mode signals generated by a device for detecting an operation state of a telephone hook switch and by the hook switch according to the present invention.
Figure 7:
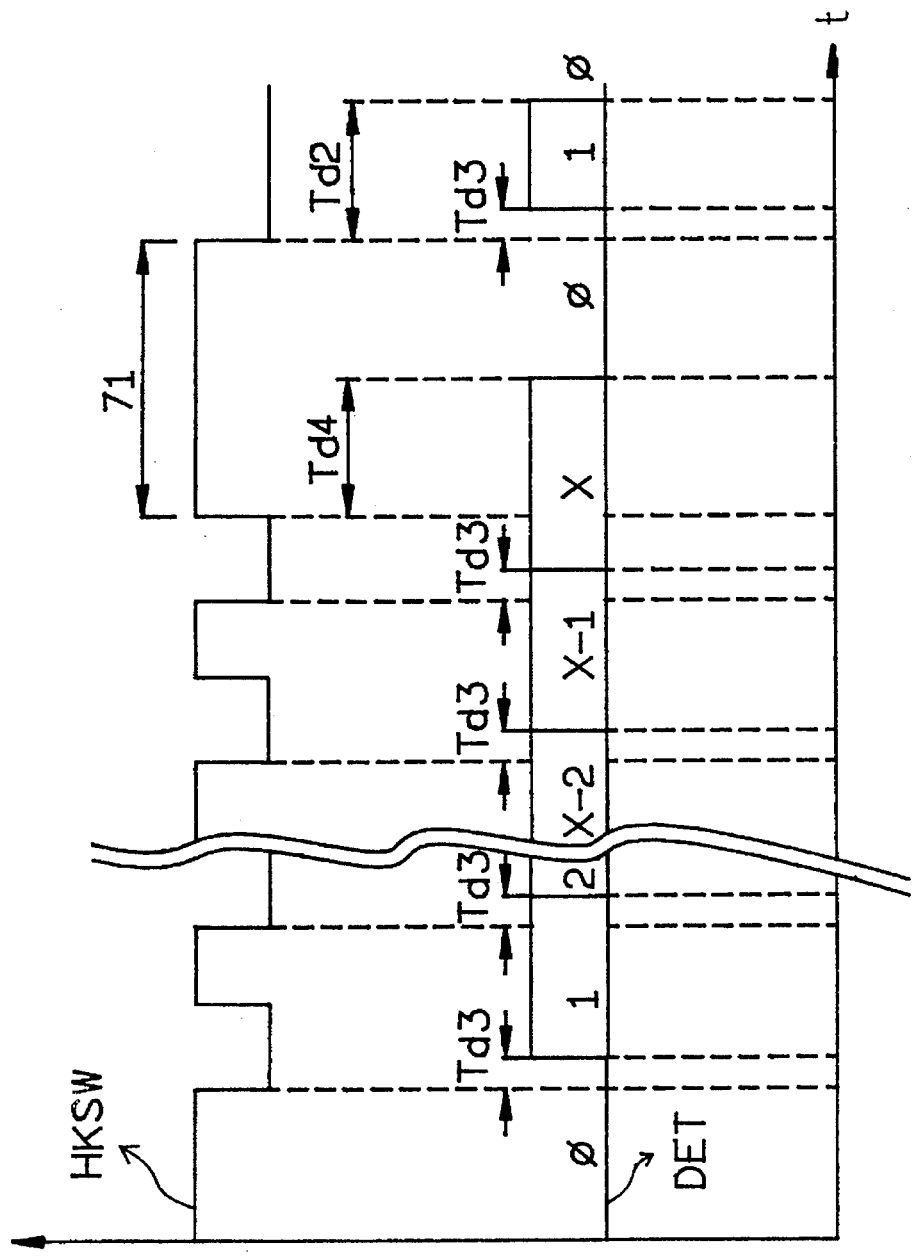
FIG. 7 is a schematic diagram showing fourth relevant pulse-mode signals generated by a device for detecting an operation state of a telephone hook switch and by the hook switch according to the present invention.

The first example of working state is shown in FIG. 4, wherein DET also shown in FIGS. 5–7 represents the time intervals counted by the timer 13 and the accumulated numbers in the counter 12. The controlling circuit 11 sends out a signal 111 to the timer 13 to have the timer 13 start to count the time interval Td3 upon detecting that the telephone is in a off-hook operation state. After the time interval Td3 is counted up, the controlling circuit 11 is informed by the timer 13 through a signal 143 to send out an enabling signal 112 to the counter 12 to have the counter 12 carried. Meanwhile, the timer 13 keeps on counting the time interval Td2.

Figure 2:
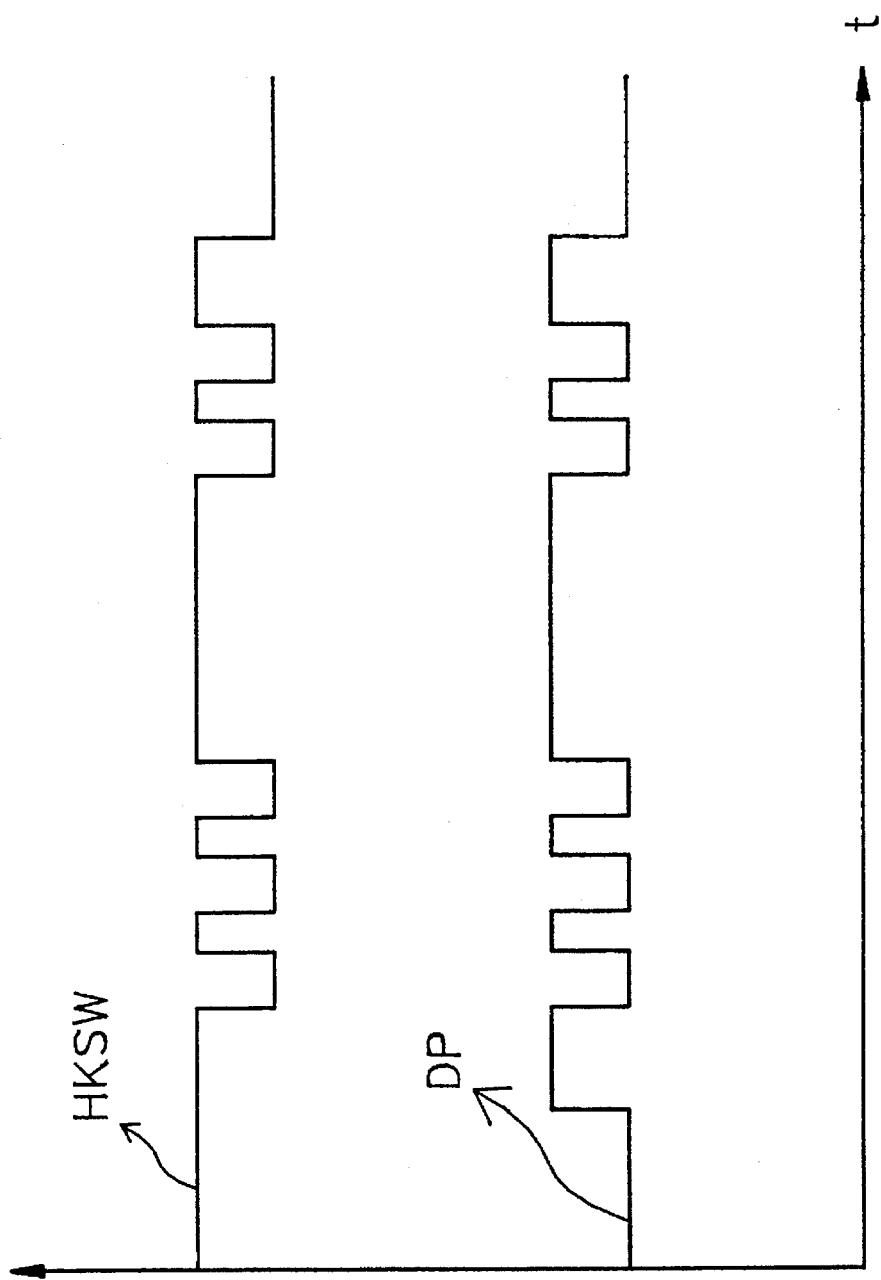
FIG. 2 is a schematic diagram showing the pulse-mode signals generated by the hook switch and the dial or keypad of a telephone which is abnormally used by artificially manipulating the hook switch.

When the controlling circuit 11 is informed of having finished counting the time interval Td2 by the timer 13 through a signal 142 and detects that the hook switch remains in an off-hook operation state, the controlling circuit 11 sends out a clearing signal 113 to the counter 12 to have the counter 12 zeroed. The controlling circuit 11 is informed of the zeroing of the counter 12 through a signal 121 and allows the telephone to be regularly dialed. It can be found that it is impossible for the user to intentionally make the hook switch generate a pulse-mode signal HKSW similar to DP as shown in FIG. 2.

The second example of working state is shown in FIG. 5. During the hook-off operation state 51, the situation is the same as the first example and the counter 12 has been zeroed. Only when the hook switch is changed from an on-hook operation state into an off-hook operation state, is the time intervals Td3 and Td2 counted by the timer 13. Therefore, during the pulse state 52, the timer 13 does not count any time interval. When the controlling circuit 11 detects that the hook switch is changed from an on-hook operation state 52 into an off-hook operation state 53, the procedure described with respect to the first example of working state starts again.

However, when the time interval Td2 has not been counted up by the timer 13 but the controlling circuit 11 detects that the hook switch is changed from an off-hook operation state 53 into an on-hook operation state 54, the controlling circuit 11 sends out the signal 111 to the timer 13 to have the timer 13 start to count another time interval Td1. When the controlling circuit 11 is informed of having finished counting the time interval Td1 by the timer 13 through a signal 141 and detects that the hook switch remains in an on-hook operation state 54, the controlling circuit 11 sends out the clearing signal 113 to the counter 12 to have the counter 12 zeroed and allows the telephone to be regularly dialed.

The third example of working state is shown in FIG. 6. The beginning situation is analogous to the second one except that the controlling circuit 11 detects that the hook switch is changed from an on-hook operation state 61 into an off-hook operation state 62 before the time interval Td1 is counted up by the timer 13. The exception makes the counter 12 unable to be zeroed. So far, it can be found that it is possible for a user to intentionally make the hook switch generate a pulse-mode signal HKSW similar to DP as shown in FIG. 2. Accordingly, when the counter 12 is accumulatedly carried to a prestored reference value X, the counter 12 sends out a signal 122 to the controlling circuit 11 and the controlling circuit 11 disallows the telephone to be successfully dialed. That the telephone is disallowed to be successfully dialed is to make the telephone and the exchange electrically connected thereto under a call disconnection state or to utilize the mute function of the telephone to make the telephone under a sound-forbidden state and the users unable to listen to each other. In order to make the detecting device be flexibly used in various telephone with different dial rates and make-break-ratios, the prestored reference value X mentioned above can be set by a user.

The fourth example of working state which follows the third one is shown in FIG. 7. When the telephone is disallowed to be dialed, the timer 13 starts to count the time interval Td4. During the time interval Td4, the operation state 71 of the hook switch remains to be on-hook, so the controlling circuit 11 generates the clearing signal 113 to the counter 12 to have the counter 12 zeroed. Then, the telephone can be used regularly.

While the invention has been described in terms of what are presently considered to be the most practical and preferred embodiments, it is to be understood that the invention need not be limited to the disclosed embodiments. On the contrary, it is intended to cover various modifications and similar arrangements included within the spirit and scope of the appended claims which are to be accorded with the broadest interpretation so as to encompass all such modifications and similar structures.

What we claim is:

1. A device for detecting an operation state of a telephone hook switch for selectively preventing hook switch dialing in a telephone set, said device comprising:

a timer for producing intervals of different predetermined durations and outputting pulses, each of said pulses being indicative of a completion of producing a corresponding interval of said intervals;

a controlling circuit electrically connected to telephone hook switch and adapted to generate a starting signal for said timer in response to said telephone hook switch going from an on-hook operation state to an off-hook operation state, and an enabling signal and a clearing signal in response to said pulses; and a counter electrically connected to said controlling circuit and adapted to start counting upon receiving said enabling signal and to be zeroed upon receiving said clearing signal, said counter outputting a signal to said controlling circuit for preventing a telephone having said telephone hook switch from being successfully dialed when said counter has counted up to a predetermined reference value defining a number of dial pulses forbidden to be dialed by virtue of said telephone hook switch.

2. A device according to claim 1, wherein said preventing a telephone having said telephone hook switch from being successfully dialed is performed by placing said telephone and an exchange electrically connected thereto in a call disconnection state.

3. A device according to claim 1, wherein said preventing a telephone having said telephone hook switch from being successfully dialed is performed by a mute signal of said telephone utilized to place said telephone in a sound-forbidden state to make users unable to listen to each other.

4. A device according to claim 1, being incorporated in a dial of said telephone.

5. A device according to claim 1, being incorporated in a keypad of said telephone.

6. A device according to claim 1, being electrically connected to a dial of said telephone.

7. A device according to claim 1, being electrically connected to a keypad of said telephone.

8. A device according to claim 1, wherein said time intervals include a first, a second, a third, and a fourth time intervals Td1, Td2, Td3, and Td4, respectively.

9. A device according to claim 1, wherein said reference value is prestored in said counter.

10. A device according to claim 8, wherein said timer is adapted to start producing said time intervals Td3 and Td2 whenever said telephone hook switch is changed from said on-hook operation state into said off-hook operation state.

11. A device according to claim 10, wherein said controlling circuit has said counter zeroed when said controlling circuit detects that said time intervals Td3 and Td2 have been produced by said timer and said telephone hook switch remains in said off-hook operation state.

12. A device according to claim 8, wherein said controlling circuit enables said timer to produce said time interval Td1 when, while said timer is still producing said time interval Td2, said controlling circuit has detected that said telephone hook switch is changed from said off-hook operation state into said on-hook operation state.

13. A device according to claim 12, wherein said controlling circuit has said counter zeroed when said controlling circuit detects that said time interval Td1 has been produced by said timer and said telephone hook switch remains in said on-hook operation state.

14. A device according to claim 8, wherein upon said preventing a telephone having said telephone hook switch from being successfully dialed, said controlling circuit enables said timer to produce said time interval Td4 when said telephone hook switch is in said on-hook operation state, and has said counter zeroed upon detecting that said time interval Td4 has been produced by said timer and said telephone hook switch remains in said on-hook operation state.

\* \* \* \* \*